United States Patent [19]

Cannella et al.

[11] Patent Number: 5,063,592
[45] Date of Patent: Nov. 5, 1991

[54] CONTROL OF NON-LOCALLY SWITCHED TELECOMMUNICATION SERVICES

[75] Inventors: Stephen J. Cannella, Edison; Ali R. Zaringhalam, North Caldwell, both of N.J.

[73] Assignee: AT&T Bell Laboratories, Murray Hill, N.J.

[21] Appl. No.: 443,303

[22] Filed: Nov. 29, 1989

[51] Int. Cl.$^5$ ............................................. H04M 7/00
[52] U.S. Cl. .................................... 379/207; 379/219; 379/220
[58] Field of Search ............... 379/220, 229, 230, 240, 379/219, 207, 225, 201, 221

[56] References Cited

U.S. PATENT DOCUMENTS 4,611,096 9/1986 Asmuth et al. ...................... 379/207
4,757,526 7/1988 Foster et al. ...................... 379/229 X
4,811,334 3/1989 Matt ................................. 379/229 X Primary Examiner—James L. Dwyer
Attorney, Agent, or Firm—P. Visserman; W. Ulrich

[57] ABSTRACT

Foreign exchange subscriber service is provided via a local ISDN exchange which selectively establishes switched connections between a customer's ISDN terminal and a trunk circuit dedicated to the foreign exchange line. The same ISDN subscriber line may be used for local service and foreign exchange service to several different foreign exchanges. The customer's ISDN terminal has a separate call appearance for each foreign exchange line and call appearance information is used in ISDN messages transmitted between the local exchange and the customer's terminal to uniquely identify local and foreign exchange service connections.

22 Claims, 3 Drawing Sheets

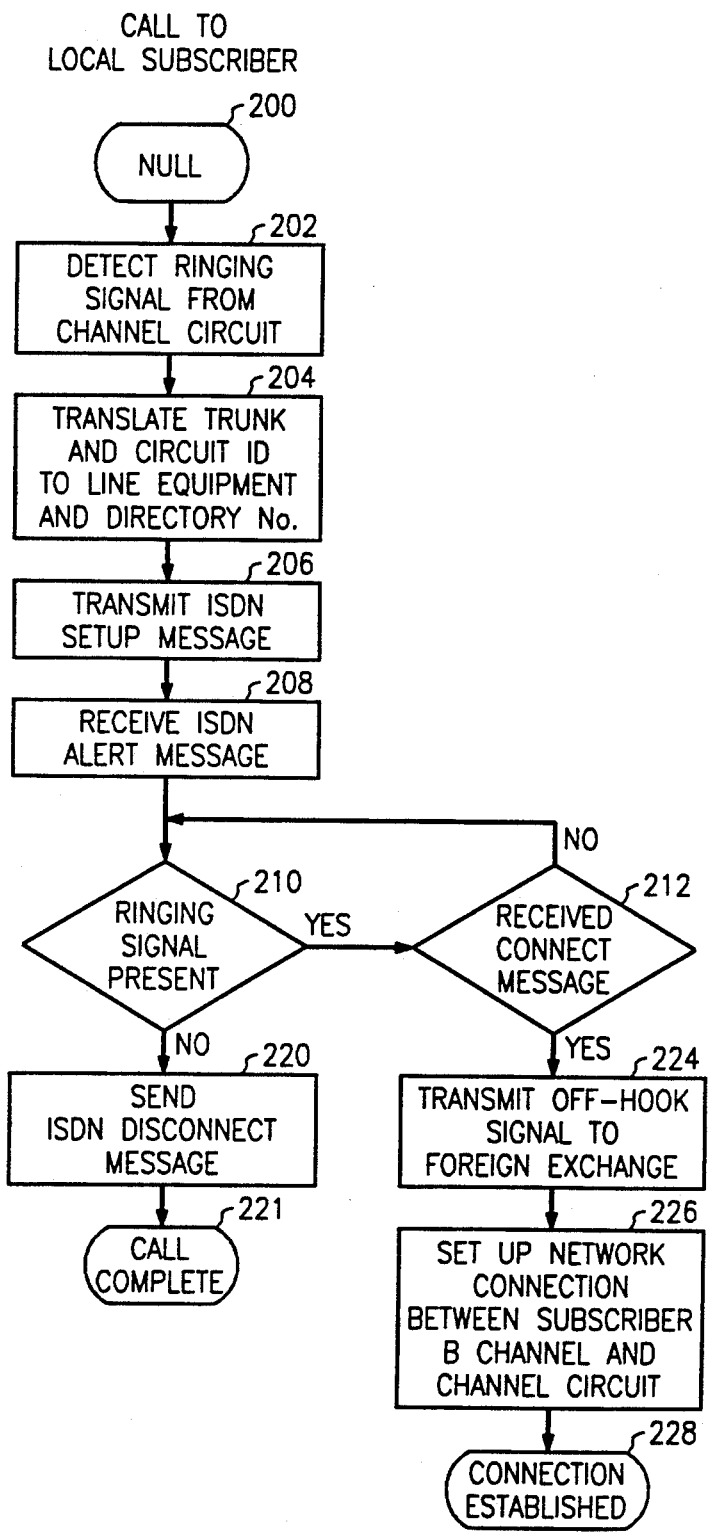
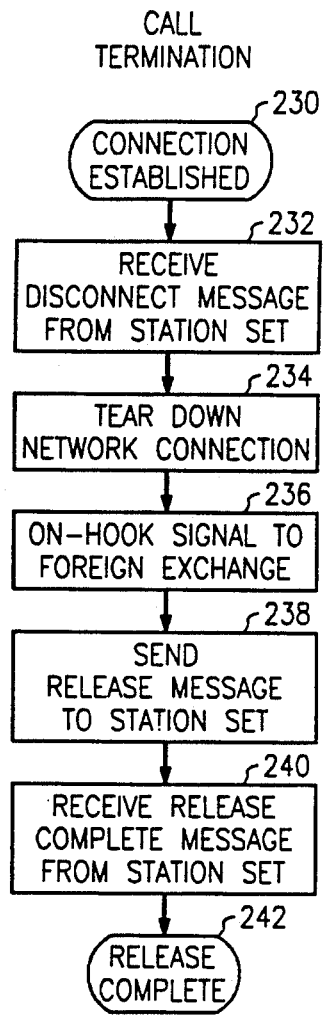

CONTROL OF NON-LOCALLY SWITCHED TELECOMMUNICATION SERVICES

BACKGROUND OF THE INVENTION

Non-locally switched services are services provided to a local subscriber from a distant (foreign) telephone exchange. Such services are in demand, for example, for businesses which are located remote from a city and which wish to have a telephone number which is a local number for customers in that city. Prior art arrangements for such non-locally switched services require a direct connection from the foreign exchange to the premises of the customer. Typically, telephone exchanges are not equipped to handle subscriber connection lines which are much longer than normally anticipated for local services connections are commonly made via long distance trunks extending between exchanges, which are treated quite differently from lines in the exchange. One prior art foreign exchange arrangement consists of a connection from a subscriber connection line output of the exchange to special equipment connected to a transmission carrier system which transmits signals over a channel, fully dedicated to the foreign exchange line. Additional special equipment is needed at the other end of the carrier to provide an interface between the long distance carrier and a terminal on the customer's premises. The special equipment connecting to the customer premises is required to provide certain functions normally performed by an exchange, such as detecting off-hook and providing ringing current for alerting the subscriber. Such special equipment which duplicates exchange functions represents an additional expense. Furthermore, the prior art arrangement requires a separate subscriber line for the foreign exchange connection, which is in addition to the subscriber line normally provided to customer premises for local services. A subscriber desiring foreign exchange service from more than one distant exchange has to have a separate foreign exchange line for each such connection. A significant problem of the prior art is the substantial cost of the special equipment needed to provide a customer with foreign exchange telephone service.

SUMMARY OF THE INVENTION

This and other problems of the prior art are overcome in accordance with the principles of this invention by providing a connection in the subscriber's local exchange, between a terminal on the customer's premises and the transmission carrier connected to a foreign exchange line termination at the foreign exchange. Foreign exchange services, in accordance with this invention, using the facilities already available for local services such as the local subscriber line, and eliminating the dedicated subscriber line and special equipment for providing ringing and the like, used in the prior art. Transmission facilities, terminating in foreign exchange subscriber line appearances of the foreign exchange, are connected to the local exchange. The local exchange responds to signals from the local subscriber line and from designated transmission facilities to selectively effect interconnecting paths between the line and the transmission facilities, thereby providing a foreign exchange connection through the local exchange from the terminal to the appearances of the foreign exchange.

In one embodiment of the invention, a customer's terminal is connected to the local exchange via an ISDN subscriber line which has a separate D channel for signaling and at least one B channel for communication. Advantageously, the signaling channel may be used to signal the local exchange when an origination is to take place on a selected foreign exchange line and the local exchange responds by establishing a connection through its switching network to the carrier system. Similarly, in the event of a call from a foreign exchange to the customer, the local exchange recognizes encoded signals on the carrier and provides alerting to the customer via D channel signaling. Advantageously, the customer premises equipment may comprise a single ISDN set with multiple call appearances, such as is standard on ISDN sets. The call appearances may be in the form of buttons which when activated transmit a standard ISDN message to the local exchange, including the identity of the originating line, and the local exchange, when recognizing that the origination is from a foreign exchange line, establishes the connection to a predefined outgoing transmission channel of the interconnecting transmission carrier. Additionally, the local exchange transmits to the foreign exchange an origination signal representing a request for foreign exchange service which is received at a subscriber line appearance of the foreign exchange. The foreign exchange honors the request by providing dial tone and interpreting directory number digits transmitted from the terminal. It is a further advantage of this invention that a single subscriber line may be used to provide both local and foreign exchange services. Furthermore, with a single subscriber line between the local exchange and the customer's premises, service can be provided to many foreign exchanges. A further advantage of the present invention is that separate prior art equipment required for the detection of an origination and for providing alerting signaling to the customer is already present in the local exchange and the relatively high expense of providing and maintaining such special equipment is avoided.

BRIEF DESCRIPTION OF THE DRAWING

The invention may be better understood from the following detailed description when read in conjunction with the drawing, in which:

FIG. 2 through 4 are flow diagram representations of call processing functions executed in the local exchange of FIG. 1.

DETAILED DESCRIPTION

Figure 1:
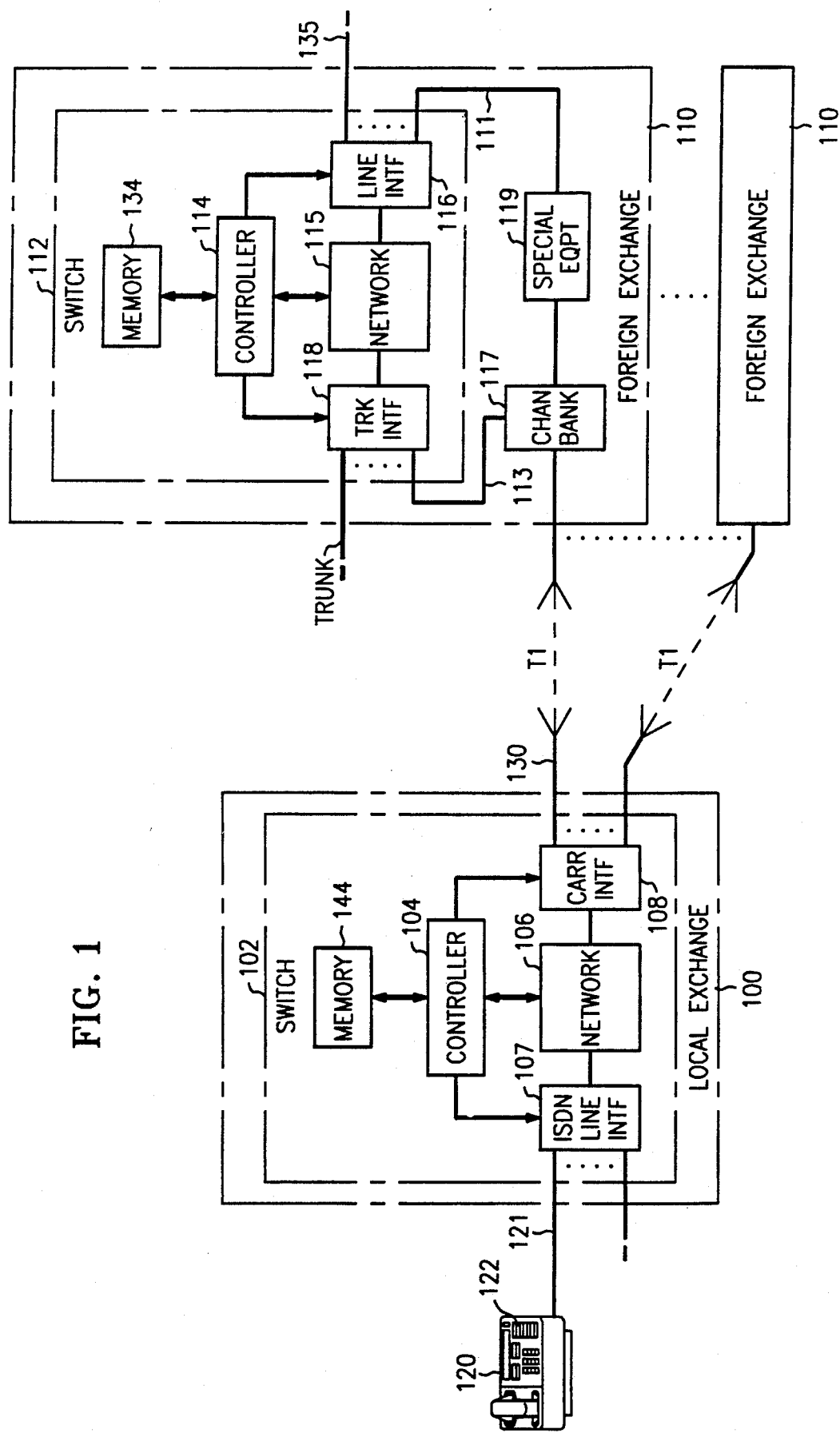
FIG. 1 is a block diagram representation of an illustrative telecommunication system incorporating the principles of the invention.

FIG. 1 shows a local exchange 100 connected to a plurality of other exchanges 110, referred to herein as the foreign exchanges. A customer premises telephone set 120 is connected to the local exchange via a subscriber line 121. The telephone set 120 may for example be a standard ISDN telephone set having a plurality of call appearance positions 122 such as the commercially available AT&T ISDN 7507 station set. The subscriber line 121 may be a standard ISDN basic rate interface subscriber line. The local exchange 100 comprises a switch 102 adapted for ISDN, and may for example be a switching system adapted such as described in U.S. Pat. No. 4,592,048 of Beckner et al., entitled "Integrated Packet Switching and Circuit Switching System". The switch 102 comprises a controller 104 and a network 106 controlled by the controller 104 for selectively establishing interconnections within the switch, and particularly between interface unit 107 and 108. The subscriber line 121 is connected to the network via the ISDN line interface unit 107 as described for example, in Beckner et al. The carrier interface unit 108 connects an interexchange trunk 130 to the switching network 106. The interexchange trunk may be a well known T1-carrier multichannel digital trunk. The carrier interface 108 is a well known circuit which provides an interface between digital interexchange trunks transmitting information, for example, in the T1-carrier format and a switching network. The function of this circuit are often performed by well known digital channel bank units which provide an interface between T1 trunks and other equipment in the exchange. The controller 104 has access to the ISDN line interface 107 and the carrier interface 108 for the purpose of detecting signaling from the interfaces and for controlling the interfaces to provide output signaling. The local exchange 100 communicates with the telephone terminal 120 by means of standard ISDN messages which are defined, for example, in the publically available AT&T document entitled "5ESS ® Switch ISDN Basic Rate Interface Specification 5E5 Generic Program," AT&T publication No. AT&T5D5-900-311.

In one embodiment of the invention, the foreign exchanges 110 may be any prior art exchanges comprising a switch 112 which may, for example, be a switching system such as described in the Bell System Technical Journal, Vol. XLIII, September 1964, No. 5, entitled "Number 1 Electronic Switching System," Part 1 and Part 2. The switch 112 typically includes a controller 114 which controls a network 115 to selectively establish interconnections within the switch. Further, a line interface circuit 116 and a trunk interface circuit 118 are connected to the network 115 and to the controller 114 to allow the controller to detect activity at the interfaces and to control actions at the interfaces. The foreign exchange 110 further comprises a well known digital channel bank unit 117 which is connected to the trunk interface 118 and interexchange carrier trunk 130. The channel bank 117 may be a well known channel bank for converting information between the digital T1-carrier format used on the T1 line and the analog form used at the analog trunk interface 118. Further connected to the channel bank 117 is special equipment 119 for connecting the channel bank to the line side of the switch 112. The special equipment 119 is connected via a subscriber line 111 to the line interface 116 of the switch 112. The special equipment, which in the prior art is a single-channel circuit commonly incorporated in the channel bank 117, provides an interface between a standard subscriber line connection, such as line 111, and a circuit of the T1 trunk 130 dedicated to subscriber line 111. The need for special equipment in order to provide a connection from the line side of the exchange to an interexchange trunk and provide compatibility of line side signaling to the channel bank 117 and T1 trunk 130 has been recognized in the prior art.

FIG. 2 is a flow chart representation of functions performed in the switch 102 of the local exchange 100 in implementing the principles of the invention. In the arrangement of FIG. 1 a call may be extended from one of the foreign exchanges 110 for example from subscriber line 135, to a directory number assigned to the remotely located terminal 120. When the calling party dials the directory number, which is a local number of the exchange 110, the switch 112 will handle the incoming call in a standard fashion and, by interpretation of the directory number, will select the local subscriber line assigned to terminal 120. In this example, line 111 is assigned to terminal 120 and switch 112, in accordance with normal call handling practices, provides a ringing signal to the line 111. Line 111 is connected to a dedicated channel of the interexchange trunk 130 via the special equipment 119. The well known special equipment includes circuitry dedicated to line 111, for converting the standard line ringing signals into a signal recognized by the channel bank 117 as a ringing signal. The converted ringing signal is transmitted over the dedicated channel of the carrier 130 to exchange 100. The signaling over the carrier is standard T1 signaling, which will be recognized by the carrier interface circuit 108 of the local exchange 100 and translated into signals which are readily detectable by the controller 104 at the carrier interface 108. Block 202 of FIG. 2 represents the detection of a ringing signal from a channel circuit at the interface circuit 108. The interface circuit 108 can terminate several carrier trunks 130, each having a plurality of channels. The controller 104 obtains trunk and channel identification information for the detected ringing signal from interface circuit 108. The trunk and channel identification are translated into a line equipment number of the ISDN subscriber line 121 and the directory number defined for the identified channel. The translation is made by controller 104 with the aid of tables stored in a well known memory 144. Table 1 shows an exemplary table of trunk identification numbers. Each entry of table 1 includes a pointer to a table of channel numbers associated with the trunk. Table 2 is an exemplary table of channel numbers and each entry includes a line equipment number and a directory number uniquely associated with each channel. The line equipment number will identify the appropriate ISDN subscriber line, but the line may serve several directory numbers represented by call appearance positions 122 on subscriber set 120. The translation step performed by controller 104 is shown in block 204. To complete the call, controller 104 transmits an ISDN SETUP message to the subscriber line 121, associated with the obtained line equipment number. This is shown in block 206 of FIG. 2. The SETUP message is a standard message defined in the aforementioned ISDN Basic Rate Interface document and includes defining call appearance or directory number information defining the one of the directory number call appearance positions 122 to be activated on the multiple directory number ISDN set 120. The ISDN set 120 after receiving the SETUP message will generate an alerting signal at the set and activate the appropriate position 122. The set will transmit an ISDN ALERT message which is received at the exchange, as indicated in block 208 of FIG. 2, where it is treated as an acknowledge.

The condition of each of the channels of the carrier trunks 130 is scanned periodically at the carrier interface 108 as part of normal call processing. In decision block 210 a test is made to determine whether the ringing signal is still present on the channel circuit from which ringing was originally detected in block 202. If it is still present, a test is made to determine whether the ISDN CONNECT message has been received from the terminal. If not, the test in block 210 will be repeated after an appropriate delay. If it is found in the test of block 210 that the ringing signal is no longer present, indicating that the originating party connected to the foreign exchange has gone on-hook, a transfer is made to block 220 and an ISDN DISCONNECT message is sent to the ISDN terminal 120, to cause the alerting signaling at the terminal to be terminated, in a standard fashion. Block 221 indicates that the call is then completed. If the ISDN set 120 goes off-hook to answer the call, the set will transmit the ISDN CONNECT message to switch 102. This will be detected by controller 104 and will be reflected in the test performed in block 212. Thereafter, an advance is made to perform the function of block 224 in which the controller 104 controls the carrier interface 108 to transmit a standard T1 format off-hook signal on the channel circuit from which ringing was detected in block 202. The ISDN CONNECT message transmitted by the terminal 120 includes information identifying an ISDN B-channel selected for use in the call. The controller 104 controls the network 106 to establish an information transfer path between the selected B-channel at the ISDN line interface 107 and the appropriate channel circuit of the transmission carrier 130, in carrier interface 108. This activity is reflected in block 226. After the network connection has been setup, the part of the telephone connection in local exchange 100 is fully established, as indicated in block 228. Within the local exchange 100, the call will remain in this state until an ISDN DISCONNECT message is received from the subscriber ISDN set 120. In this particular example, a call was originated from the foreign exchange 110. If it is terminated by the caller connected to that exchange, the call processing software of the switch 112 will tear down internal connections. However, since line 111 is a standard subscriber line, the foreign exchange will not provide any further signaling on the line 111. Accordingly, the connection from line 111 to the subscriber station 120 over the carrier trunk 130 and network 106 will remain intact until the terminal 120 goes on-hook. The foreign exchange 110 may treat the off-hook indication as an origination or provide an announcement, in the same way as is commonly done when a party leaves the telephone off-hook.

FIG. 3 shows the termination sequence in the local exchange 100. Block 230 shows the call to be in the "connection established" state which corresponds to the state shown in block 228 of FIG. 2. In block 232 of FIG. 3 it is shown that the local exchange 100 receives the ISDN DISCONNECT message from the station set 120. In response thereto, the controller 104 will control network 106 to tear down the network connection between the subscriber's B channel at line interface 107 and the carrier trunk circuit at carrier interface 108, as shown in block 234. Thereafter, as indicated in block 236, an on-hook signal is transmitted via the carrier interface 108 and carrier trunk 130 to the foreign exchange 110 using standard T1-format signaling. At the foreign the exchange on-hook signal will be applied on line 111 via special equipment 119. The on-hook signal on line 111 will be accorded the same treatment as an on-hook signal from any station set connected to line interface 116. The local exchange 100 also sends the standard ISDN RELEASE message to the station set 120 as reflected in block 238. This message is part of the normal ISDN and indicates that the local exchange has released the channels involved in the call. The station set will respond by transmitting the RELEASE COMPLETE message indicating that the channels have been released. The local exchange receives that message as indicated in block 240 and at that point all functions with respect to the call have been completed, as indicated in block 242 of FIG. 3.

Figure 4:
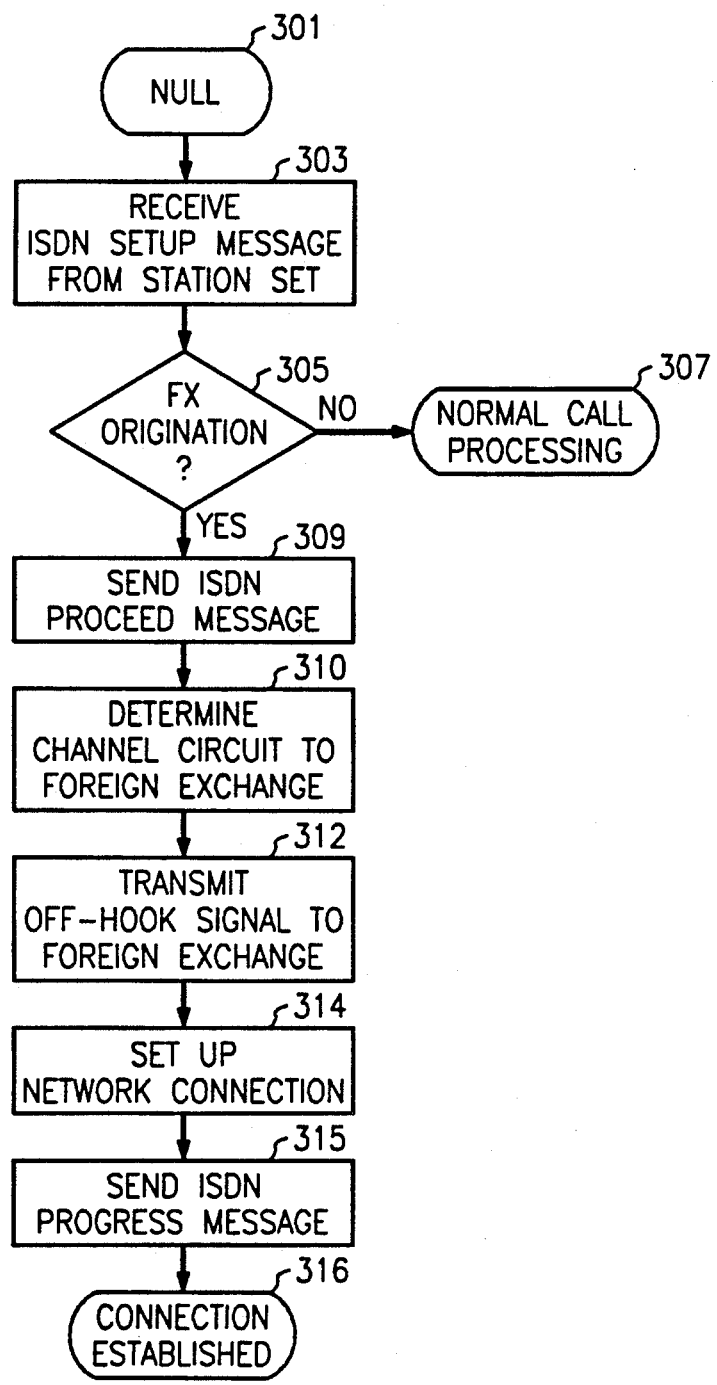

The functions described before herein have been with respect to a call initiated from the foreign exchange 110 to the subscriber station 120 connected to the local exchange 100. In the event of an initiation of a call from the subscriber station 120, a different set of actions is taken in the local exchange 100 as indicated in flow diagram shown in FIG. 4. Block 301 of FIG. 4 indicates the null state of the program and a transition is made from the null state 301 when the local exchange 100 receives the standard ISDN SETUP message from the station set 120, as indicated in block 303. Thereafter, a determination must be made, as indicated in decision block 305, to determine whether the SETUP message reflects a foreign exchange origination or a normal call processing origination. As indicated earlier, the ISDN station set 120 is provided with multiple call appearance positions 121. For example, the station is set 120 may be assigned one or more directory numbers at the local switch 100. In addition, the set may be assigned one or more directory numbers at each of a plurality of foreign exchanges 110. Each assigned directory number will have a separate call appearance. In terms of the aforementioned ISDN Basic Rate Interface document, the multiple appearance arrangement is considered part of basic key system features. For such features the ISDN SETUP message includes an origination call appearance or directory number information element. This element is used by controller 104 to examine a table in the memory 144 which includes a foreign exchange indication for each call appearance number in the table. A table such as Table 3 exists for each ISDN line of local exchange 100. Table 3 is a list of line equipment number pointers which point to corresponding call appearance tables, e.g. Table 4. Table 4 in this exemplary embodiment shows three call appearances, one local and two for different foreign exchanges, as indicated by the different directory number office codes. In decision block 305 the call appearance table (Table 4) is examined and if no foreign exchange is indicated for the call appearance in question, the program will perform normal call processing, as indicated in block 307, such normal processing is well known and does not need to be discussed herein. If the test block 305 indicates that it is a foreign exchange origination, an advance is made to block 309 and a standard ISDN CALL PROCEEDING message is sent to the station set 120 acknowledging that the call is being handled. In block 310 of FIG. 4, identity of the carrier trunk and channel circuit to the foreign exchange is obtained from the information in Table 4, which includes the identification of the trunk and channel dedicated to each call appearance or directory number. Block 312 of FIG. 4 indicates the transmission of an off hook signal to the foreign exchange via the dedicated channel circuit. Thereafter, controller 104 controls network 106 to establish a connection from the subscriber B channel identified in the ISDN SETUP message, at line interface 107, to the dedicated channel circuit at carrier interface 108, as indicated in block 314. Thereafter, as indicated in block 315, the ISDN PROGRESS message is sent to the terminal 120 to indicate that a connection has been cut through. Once that is accomplished, the connection is fully established as reflected in block 316. The local exchange will take no further action with respect to the call until a DISCONNECT message is received from the station set 120 as discussed earlier herein with respect to FIG. 3.

Dial tone is provided to the set 120 from the foreign exchange via the dedicated channel in carrier trunk 130 and the connection existing in local exchange 100. Inband dual tone multifrequency signals representing dialed digits are transmitted via the established connection directly from terminal 120 to the foreign exchange, without interaction by the local exchange 100.

It is to be understood that the above described arrangement is merely an illustrative application of the principles of the invention. Numerous other arrangements may be devised by those skilled in the art without departing from the spirit and scope of the invention.

TABLE 1

| TRUNK 1 POINTER |
| --- |
|  |
|  |
| TRUNK n POINTER |

TABLE 2

| ADDRESS | | |
| --- | --- | --- |
| CH1 | LEQ | DIR # |
|  |  |  |
| CHn | LEQ | DIR # |

TABLE 3

| LEQ 111 POINTER |
| --- |
|  |
|  |
| LEQ n POINTER |

TABLE 4

| ADDRESS | | | | |
| --- | --- | --- | --- | --- |
| CALL APPEAR | DIR # | FX | CARRIER FACIL. | CHANNEL |
| 1 | 4326 | 0 |  |  |
| 2 | 231-7500 | 1 | 201 | 10 |
| 3 | 668-1720 | 1 | 105 | 22 |

We claim:

1. An arrangement for providing a connection from a first exchange to a remotely located telephone terminal, comprising:
   a second exchange;
   transmission means for interconnecting said first and said second exchanges;
   said first exchange comprising first subscriber line interface means for connection to subscriber lines and means for establishing a direct unswitched connection from said first subscriber line interface means to said transmission means;
   said second exchange comprising facilities interface means for connection to said transmission means, second subscriber line interface means for connection to a subscriber line connected to said remote terminal, network means for selective interconnecting said second line interface means and said facilities interface means and means responsive to origination signals on said subscriber line connected to said terminal for controlling said network to establish an interconnecting path between said second line interface means and said facilities interface means and for transmitting to said first exchange signals indicative of an origination at said remote terminal;
   whereby a connection is selectively established between a subscriber line of said first exchange and said remotely located terminal via said second exchange and said second exchange transmits to said first exchange signals indicating an origination at said terminal.

2. An arrangement for providing foreign exchange telephone service from a telephone terminal to at least one remotely located exchange, comprising:
   first interface means for connection to said telephone terminal, second interface means for connection to said at least one exchange and means responsive to foreign exchange service request signals from said terminal, including signals identifying a selected exchange, to selectively establish a connection between said first interface means and said second interface means, thereby providing an interconnecting path between said terminal and said selected exchange, and further responsive to said origination signals to transmit to said selected exchange information indicative of a request from said terminal for foreign exchange service over a public switched telephone network.

3. The arrangement in accordance with claim 2 wherein said means responsive to said foreign exchange service request signals comprises control means and a switching network connected to said first and said second interface means, said control means being responsive to said signals to control said network to selectively establish a connection between said first and said second interface means.

4. The arrangement in accordance with claim 2 wherein said first interface means comprises a multi-channel subscriber line having at least one communication channel and at least one signaling channel, wherein said foreign exchange service request signals are received on said signaling channels and wherein said interconnecting path includes said communications channel.

5. The arrangement in accordance with claim 2 wherein said second interface means comprises a plurality of a transmission facilities for connection to said selected exchange, said service request signals including a calling number code pertaining to an originating directory number assigned to said terminal;

wherein said arrangement further comprises means for storing data identifying transmission facilities in association with calling number codes; and wherein said control means is responsive to receipt of said service request signals for reading data stored in association with said calling number code included in said signals to establish said connection to one of said transmission facility identified by said data.

6. The arrangement in accordance with claim 5 wherein said control means is responsive to alerting signals on an active one of said transmission facilities to transmit to said terminal alerting signals including directory number information.

7. The arrangement in accordance with claim 6 wherein said memory stores directory number data in association with transmission facility identifying indices, and said controller is responsive to said alerting signal to access said means for storing and to transmit to said terminal directory number data stored in association with indices identifying said active one of said transmission facilities.

8. A method of providing foreign exchange service to a terminal comprising the steps of:
  receiving from said terminal at a local exchange connected to said terminal foreign exchange service request information including information identifying a foreign exchange;
  establishing in said one exchange a connection between said terminal and said identified foreign exchange; and
  transmitting to said identified foreign exchange information defining a foreign exchange line service over a public switched telephone network.

9. The method in accordance with claim 8 in a local exchange comprising memory means for storing data defining transmission facilities between said local exchange and said foreign exchange in association with indices defining directory numbers, and a plurality of transmission facilities connecting said local exchange to said identified exchange;
  wherein said foreign exchange service request information further includes information defining an originating directory number and said step of transmitting includes the step of selecting one of said transmission facilities defined by said data stored in association with indices defining said originating directory number.

10. The method in accordance with claim 9, wherein said local exchange comprising a switching network and said step of establishing comprises controlling said network to selectively establish an interconnecting path between said terminal and said selected transmission facility.

11. The method in accordance with claim 8 wherein said origination information includes indicia identifying an originating number and said method further comprises the steps of:
  determining whether the originating number is assigned to a foreign exchange, after said step of receiving;
  transmitting an acknowledge signal from said local exchange to said terminal after said step of determining; and
  transmitting a progress message from said local exchange to said terminal after said step of transmitting said information identifying said origination request to said identified foreign exchange.

12. A method of providing foreign exchange service to a terminal comprising the steps of:
  receiving at a first exchange connected to said terminal signaling information indicative of an alerting request from a second exchange, accompanied by indices relating to a directory number;
  transmitting from said first exchange to said terminal information defining an alerting signal and information defining said directory number; and
  closing a circuit connection in said first exchange to establish an interconnecting path between said terminal and said second exchange.

13. The method in accordance with claim 12 and further comprising the steps of translating said indices relating to directory numbers into a line equipment number identifying an interconnecting line between said first exchange and said terminal and translating said indices relating to a directory number into a directory number code in said first exchange, and wherein said step of transmitting comprises transmitting a message including said directory number code on said interconnecting line.

14. The method in accordance with claim 12 and further comprising the step of determining, after said step of transmitting, whether a connect request message has been received from said terminal and closing said circuit connection only after said connect request message has been received.

15. The method in accordance with claim 14 and further comprising the step of transmitting from said first exchange to said second exchange information indicative of a call answer at said terminal after receipt of said connect message.

16. An arrangement for providing foreign exchange service to a subscriber terminal, comprising:
  a local exchange;
  means for connecting said terminal to said local exchange;
  a remote exchange having means for connection to subscriber lines and means for automatically establishing switchable connections, from said means for connection, over a public switched telephone network;
  transmission means for connecting said local exchange via an unswitched connection to said means for connection to subscriber lines;
  means in said local exchange responsive to signals from said terminal for effecting a connection from said terminal through said local exchange over said transmission means to said means for connection to subscriber lines for establishing a call over a public switched telephone network.

17. The arrangement in accordance with claim 16, wherein said means for connecting to terminal comprises an ISDN subscriber line.

18. The arrangement in accordance with claim 17, wherein said terminal provides signals on said ISDN line to selectively define local and foreign exchange services.

19. An arrangement for providing foreign exchange services to a terminal connected to a local exchange by means of an ISDN subscriber line, comprising:
  transmission means connecting said local exchange to a foreign exchange and providing foreign exchange subscriber line termination at said foreign exchange; and
  means in said local exchange responsive to signals requesting foreign exchange service from said ISDN line, for effecting a switchable connection from said ISDN line to said transmission means to said foreign exchange subscriber line termination via an unswitched connection in said foreign exchange for automatically establishing switchable connections from said termination over a public switched telephone network at said foreign exchange.

20. The arrangement in accordance with claim 19 wherein said transmission means connects said local exchange to a plurality of foreign exchanges and provides foreign exchange subscriber line terminations at said plurality of exchanges, wherein said signals requesting foreign exchange service comprise an ISDN message including a foreign exchange code, and wherein said means responsive to said signals selectively provides access to a foreign exchange defined by said foreign exchange code.

21. The arrangement in accordance with claim 20, wherein said means responsive signals selectively responsive to said signals to provide local telephone service in absence of said foreign exchange code.

22. The arrangement of claim 1 wherein said first exchange further comprises means for receiving customer signals for said first subscriber line interface means and for automatically processing said signals for establishing calls over a public switched telephone network for said remotely located telephone terminal.

* * * * *